United States Patent [19]

Oyama et al.

[11] Patent Number: 5,396,434
[45] Date of Patent: Mar. 7, 1995

[54] MACHINING-ERROR CORRECTING METHOD USED FOR A NON-CIRCULAR SHAPE MACHINING APPARATUS

[75] Inventors: Hiroshi Oyama; Kenji Ito, both of Niwa, Japan

[73] Assignee: Okuma Corporation, Aichi, Japan

[21] Appl. No.: 996,402

[22] Filed: Dec. 23, 1992

[30] Foreign Application Priority Data

Dec. 25, 1991 [JP] Japan .................................. 3-357325

[51] Int. Cl.$^6$ ............................................. G06F 15/46
[52] U.S. Cl. ........................... 364/474.35; 364/474.31; 318/570; 318/573
[58] Field of Search ................. 364/474.18, 474.28, 364/474.31, 474.29, 474.34, 474.35, 474.3; 318/568.1–568.19, 570, 573

[56] References Cited

U.S. PATENT DOCUMENTS

| | | | |
|---|---|---|---|
| 4,027,245 | 5/1977 | Bourrat et al. | 235/151.11 |
| 4,538,233 | 8/1985 | Resnick et al. | 364/513 |
| 4,694,401 | 9/1987 | Higuchi | 364/475 |
| 5,031,107 | 7/1991 | Suzuki et al. | 364/474.28 |
| 5,060,164 | 10/1991 | Yoneda et al. | 364/474.29 |
| 5,229,951 | 7/1993 | Sugita et al. | 364/474.29 |

Primary Examiner—Roy N. Envall, Jr.
Assistant Examiner—Cameron H. Tousi
Attorney, Agent, or Firm—Wenderoth, Lind & Ponack

[57] ABSTRACT

A machining-error of a non-circular shape machining apparatus is corrected by controlling a movement of a tool which is synchronous with a rotation of a workpiece. A position of the tool is detected when the tool is according to a command position which is coincident with or close to a target position of the tool. At least an amplitude ratio and a phase difference of an amplitude ratio, a phase difference, and an offset difference between the target position and the detected position; is obtained. At least a process of increases and/or reducing the command position and a process of phase shift of the process for increasing and/or reducing the command position on the basis of the amplitude ratio, a process for shifting a phase on the basis of the phase difference, and a process for changing an offset of the command position on the basis of the offset difference are performed, whereby a first corrected command position is obtained. The detected position of the tool can be made to coincide with the target position quickly since the target position and the detected position are determined as a waveform, which is divided into an amplitude, a phase, an offset and a distorsion.

7 Claims, 13 Drawing Sheets

MACHINING-ERROR CORRECTING METHOD USED FOR A NON-CIRCULAR SHAPE MACHINING APPARATUS

BACKGROUND OF THE INVENTION

1. Field of the Invention

The present invention relates to a machining-error correcting method used for a non-circular shape machining apparatus such as a numerical control lathe or a numerical control grinding machine which machines a product having a non-circular-shaped section by turning or grinding a rotating workpiece.

2. Description of the Prior Art

In recent years, machining apparatuses for machining a non-circular shape such as a cam have become popular. FIG. 1 is a block diagram showing an example a numerical control lathe for machining a non-circular shape workpiece, in which a workpiece 3 is rotated at a fixed relation speed by a spindle motor 5, which rotation is detected by a pulse generator 6. On the basis of a value detected by the pulse generator 6, an X-axis servo mechanism 2 which is synchronous with the rotation of the workpiece 3, is controlled by a control apparatus 1. A drive of an X-axis driving motor 7 enables a tool rest 9 to be moved forward/backward and the workpiece 3 is machined by a tool 10 mounted on the tool rest 9. A drive of a Z-axis motor 12 is controlled by a Z-axis servo mechanism 11 to move the tool rest 9 sideways. In such a numerical control lathe for machining the non-circular shape workpiece, in order to form an intended shape by moving the cutting tool forward/backward, synchronously with the rotation of the workpiece 3, the cutting tool moves at a very high speed in comparison with usual turning, and the servo device therefore can not follow-up the command value and further a machining error occurs. As a method of correcting the machining error, a method of learning which repeats an operation of correcting a command value on the basis of an occurred error is utilized.

FIG. 2 is a block diagram showing a detailed example of a drive controlling section in the X-axis servo mechanism 2 of the control apparatus 1, which attains a method of correcting the machining errors in the non-circular shape machining apparatus after a conventional method of learning, and FIG. 3 is a flow chart showing an example of the operation thereof. The workpiece 3 is rotated at a desired rotation speed by the spindle motor 5 which is driven by a spindle driving apparatus 4. When the pulse generator 6 detects the rotation of the workpiece 3 as a pulse PS and supplies it to a counter 21, the counter 21 counts the pulse PS and sets it as a rotation angle $\theta$. A target position $f(\theta)$ of the tool 10 or a value close to the target position $f(\theta)$ is prestored in a command position data memory 25 as a command position $c(\theta)$, and a command position data reading section 22 reads the command position $c(\theta)$ which corresponds to the rotation angle $\theta$ of the workpiece 3 from the counter 21, out of the command position data memory 25, and controls the X-axis servo mechanism 2 in accordance with the command position $c(\theta)$. A detected-position data writing section 23 writes the position $a(\theta)$ of the tool 10 detected from an X-axis position detecting device 8 on an amount of one revolution of the workpiece 3, that is, on an extent of $\theta=0°$ to $360°$, into a detected-position data memory 26 (Step S10). The target position $f(\theta)$ of the tool 10 is prestored in a target position data memory 27, and a command position data correcting section 40 writes a corrected command position $cc(\theta)$ of which the command position $c(\theta)$ has been corrected by an equation (1) into the command position data memory 25, on the basis of a difference between the target position $f(\theta)$ read from the target position data memory 27 and the detected position $a(\theta)$ read from the detected position data memory 26 (Step S11).

$$cc(\theta) = c(\theta) + \{f(\theta + \Delta\theta) - a(\theta + \Delta\theta)\} \tag{1}$$

where
  $cc(\theta)$: corrected command position
  $c(\theta)$: command position
  $f(\theta)$: target position
  $a(\theta)$: detected position
  $\Delta\theta$: amount of phase shift (constant)

The command position data reading section 22 reads the corrected command position $cc(\theta)$ corresponding to the rotation angle $\theta$ of the workpiece 3 which is read from the counter 21, from the command position data memory 25, and controls the X-axis servo mechanism 2 by the corrected command position $cc(\theta)$. Then, the detected-position data writing section 23 writes the position $a(\theta)$ detected by the X-axis position detecting device 8 on an amount of one revolution of the workpiece 3, that is, on an extent of $\theta=0°$ to $360°$, into the detected-position data memory 26 (Step S12). At the next step, the command position data correcting section 40 judges whether the difference between the detected position $a(\theta)$ read from the detected position data memory 26 and the target position $f(\theta)$ read from the target position data memory 27, is larger than a fixed value or not (Step S13), and all operations are complete if the difference is not larger than a predetermined value. Alternatively, if the difference is larger than the predetermined value, the command position data correcting section 40 replaces the command position $c(\theta)$ with the corrected command position $cc(\theta)$ (Step S14), then returns to the above Step S11 and repeats the operation described above.

The above-mentioned machining-error correcting method used for the non-circular shape machining apparatus based on a process of learning, has a disadvantage in that it is essentially incapable of correcting errors since such a difference correcting method adds the errors resulting from the fact that an amplification factor of the servo mechanism is not '1', to the command value, thereby correcting them. Moreover, a relationship between a phase which produces errors and a phase of which command position is corrected on the basis of the errors, is fixed. However, these relationship between these phases may vary with a frequency at which a tool moves forward/backward and some mechanical conditions such as temperature and due to the linearity of the servo mechanism, thus such an error relating to the phase is also a factor which obstructs the divergence of the learning and is a troublesome problem.

On the other hand, another machining-error correcting method used for the non-circular shape machining apparatus, which identifies a characteristic of the servo and corrects a command position by an inverse transfer function, has come into in practical use. However, even the machining-error correcting method correcting by the inverse transfer function needs to effect correction by adding the errors to a command position to perform the machining at a higher speed and with higher accuracy, because of a difference between control models of servo mechanisms and identification errors of control parameters.

SUMMARY OF THE INVENTION

The present invention has been accomplished in the light of the above-mentioned problems, and the object of the present invention is to provide a machining-error correcting method used for a non-circular shape machining apparatus in which a detected position of a workpiece may be quickly controlled to be coincident with a target position.

According to the present invention, the method which corrects an error produced as a result of a servo mechanism being unable to fully follow the command position, can make the detected position of a tool coincide with the target position quickly since the method determines the target position and the detected position as a waveform, to thereby correct each error of the waveform divided into an amplitude, a phase, an offset and a distortion.

As described above, according to the present invention, the machining-error correcting method used for the non-circular shape machining apparatus allows the non-circular shape machining to be operated without paying any attention on the transfer characteristic of the servo system since the correction on the time-axis which has not been adopted in the prior art, that is, the correction of phase particularly can be automatically operated, and thus highly accurate machining to be quickly performed.

DESCRIPTION OF THE PREFERRED EMBODIMENTS

Figure 4:
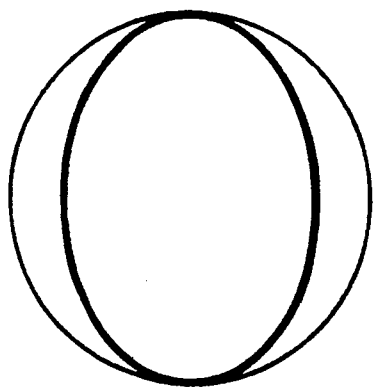
FIG. 4 is a view showing an example of a non-circular shape.
Figure 5:
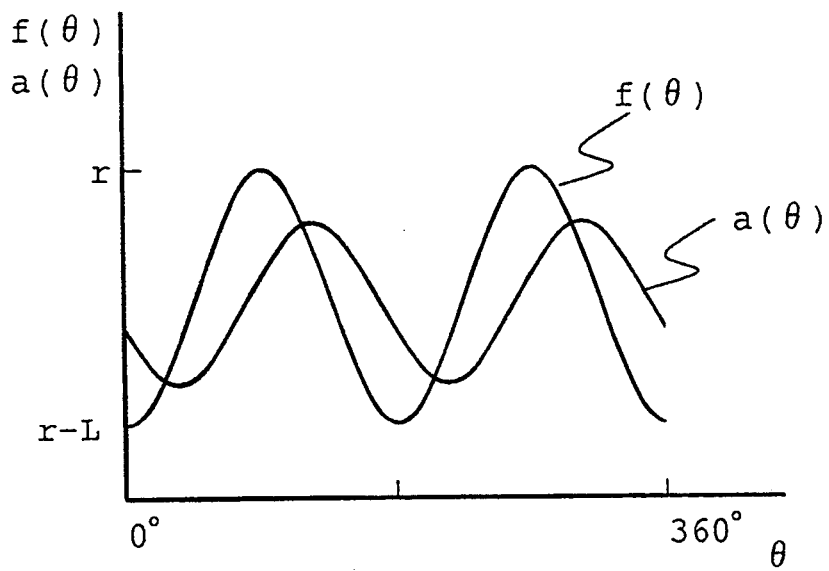
FIG. 5 is a first waveform chart illustrating the principle of the method according to the present invention.
Figure 6:
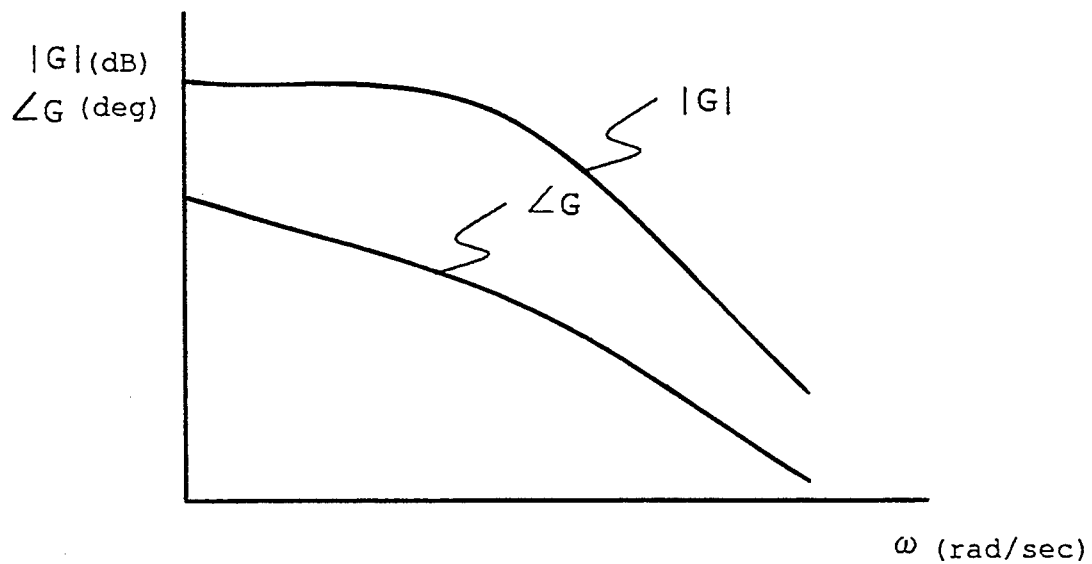
FIG. 6 is Bode diagram showing a second waveform chart illustrating the principle of the method according to the present invention.

FIG. 4 shows an example of an ellipses as a non-circular shape intended to be machined (the illustrated fine line is a circle tangent to the ellipses). FIG. 5 is a chart showing the relationships between a rotation angle $\theta$ of a workpiece and a target position $f(\theta)$ at which the shape is to be machined as well as a detected position $a(\theta)$ which has been obtained by driving a tool on the basis of the target position $f(\theta)$. As seen from the chart, there are differences between the target position $f(\theta)$ and the detected position $a(\theta)$ in amplitude and phase. In addition, an offset and a distortion which can not be discriminated because they are smaller than the waveform amplitude, exist as a factor producing an error. There is usually born a relationship of a transmission characteristic shown in the Bode diagram of FIG. 6 between the target position $f(\theta)$ and the detected position $a(\theta)$, whereby the differences of the amplitude and the phase significantly increase with increasing rotation speed of the workpiece, that is, with increasing frequency of the forward/backward moving tool. Accordingly, it is possible to correspond the detected position to the target position instantly by applying the target position $f(\theta)$ and the detected position $a(\theta)$ as a cyclic waveform which is repeated every revolution of the workpiece, by obtaining the errors of the amplitude, the offset, the phase, and the distortion of the waveform respectively, and by correcting the command position on the basis of those errors.

Figure 1:
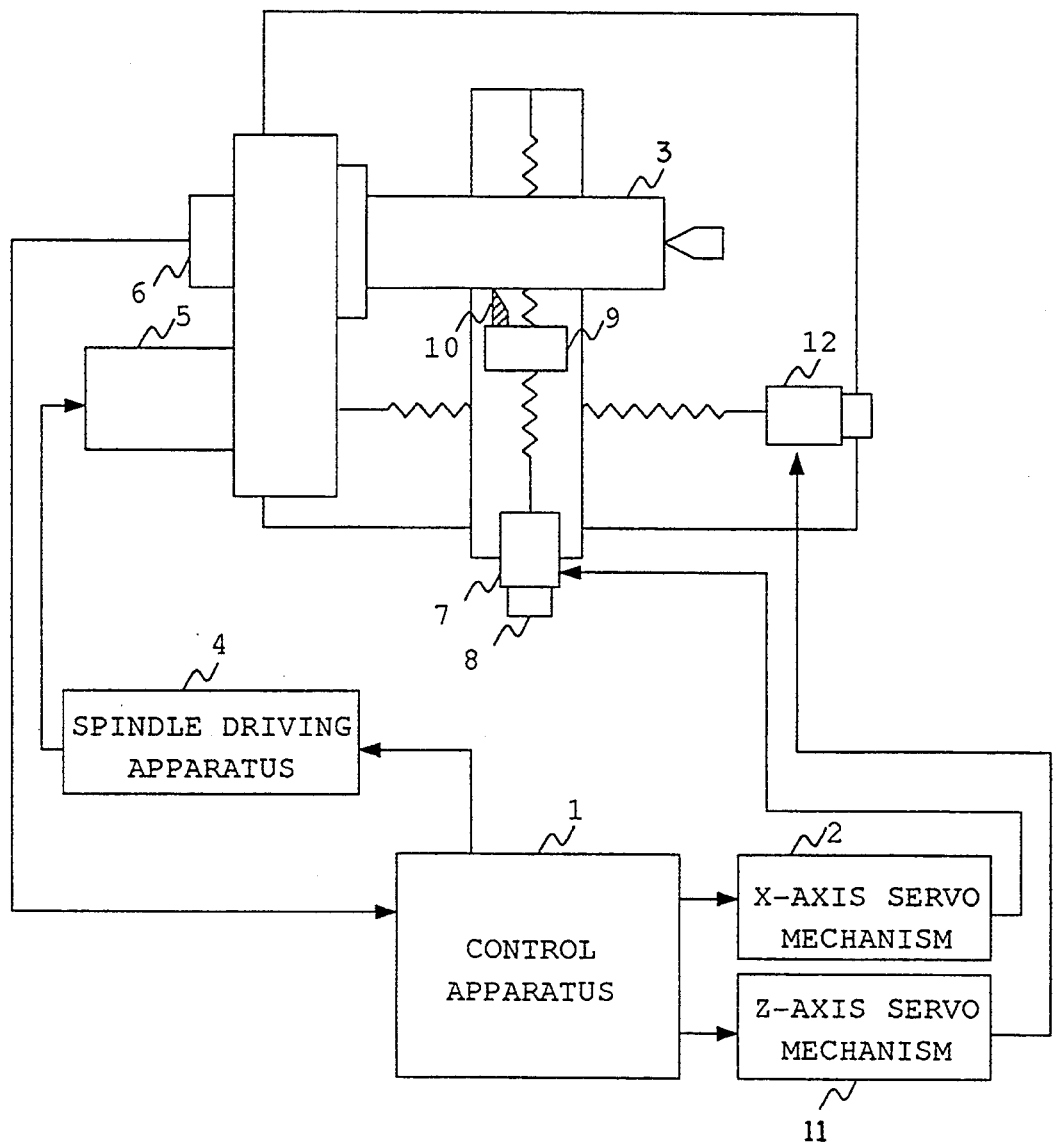
FIG. 1 is a block diagram showing an example of an ordinary type of a numerical control lathe for a non-circular shape machining.
Figure 2:
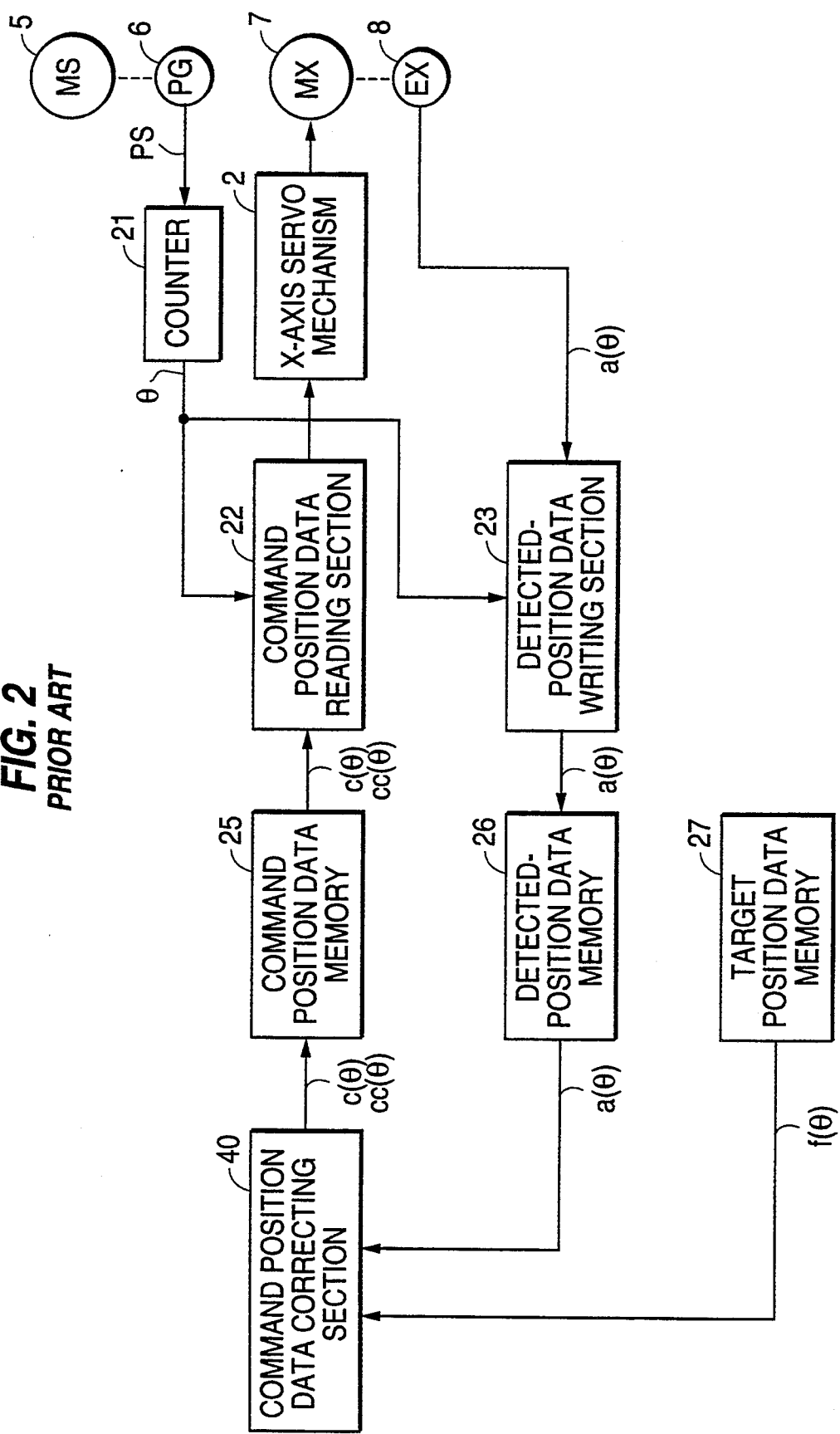
FIG. 2 is a block diagram showing an example of a control device which conducts the machining-error correcting method for a conventional non-circular shape machining apparatus.
Figure 3:
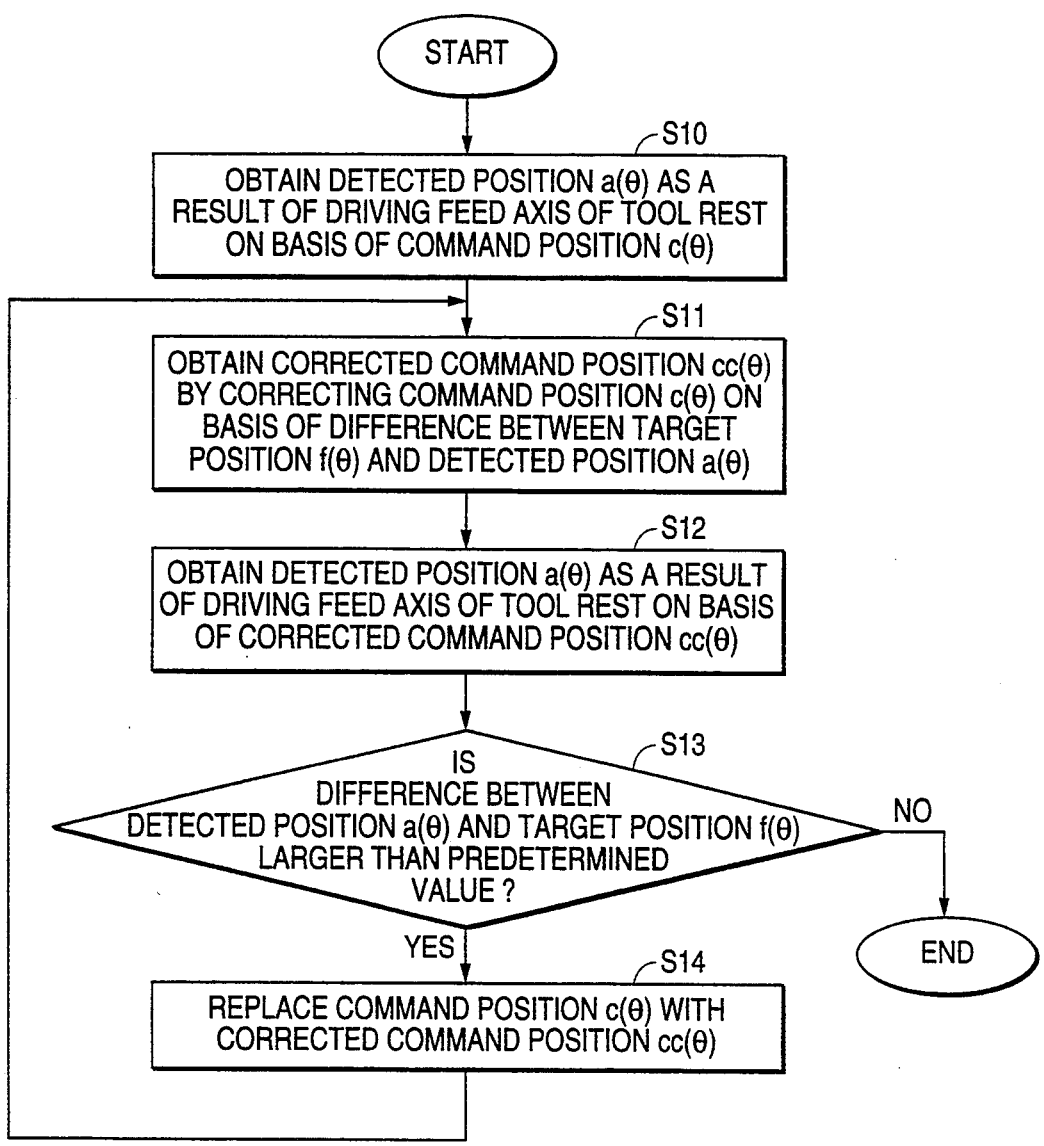
FIG. 3 is a flow chart showing an example of the operation of a conventional method in FIG. 2.
Figure 7:
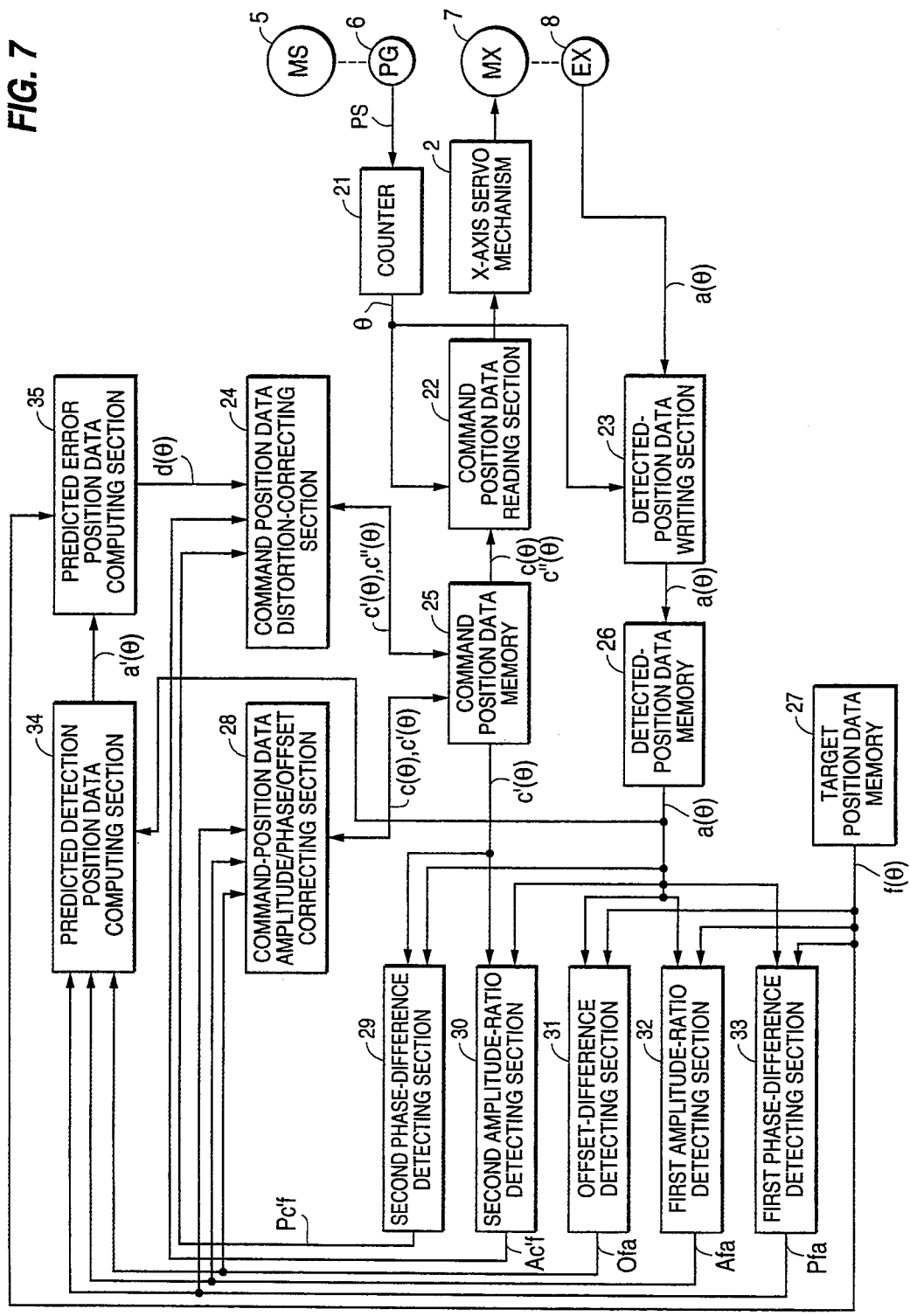
FIG. 7 is a block diagram showing an example of the control apparatus which conducts the machining-error correcting method for the non-circular shape machining apparatus according to the present invention.
Figure 8:
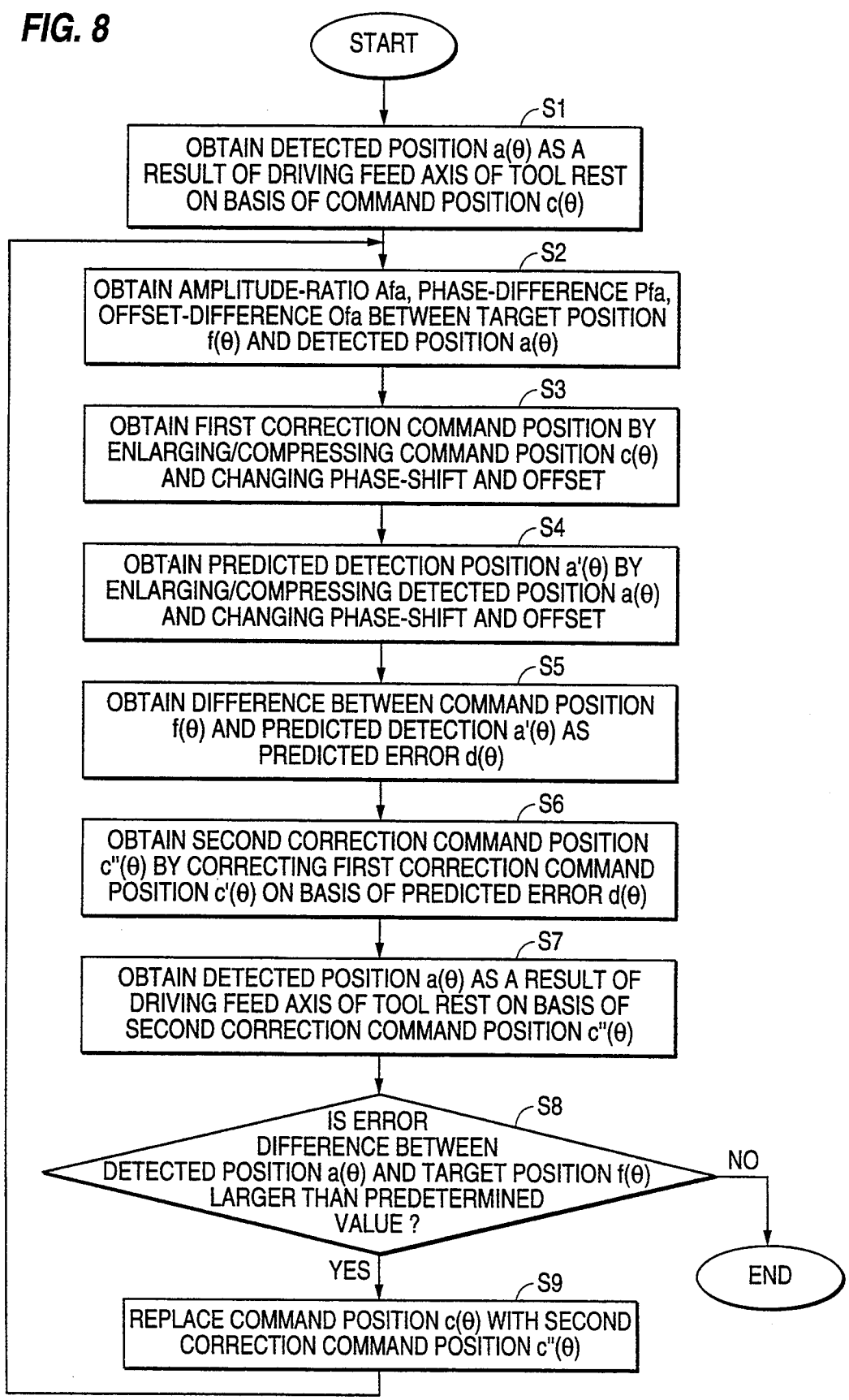
FIG. 8 is a flow chart showing an example of the operation of the method according to the present invention.
Figure 9:
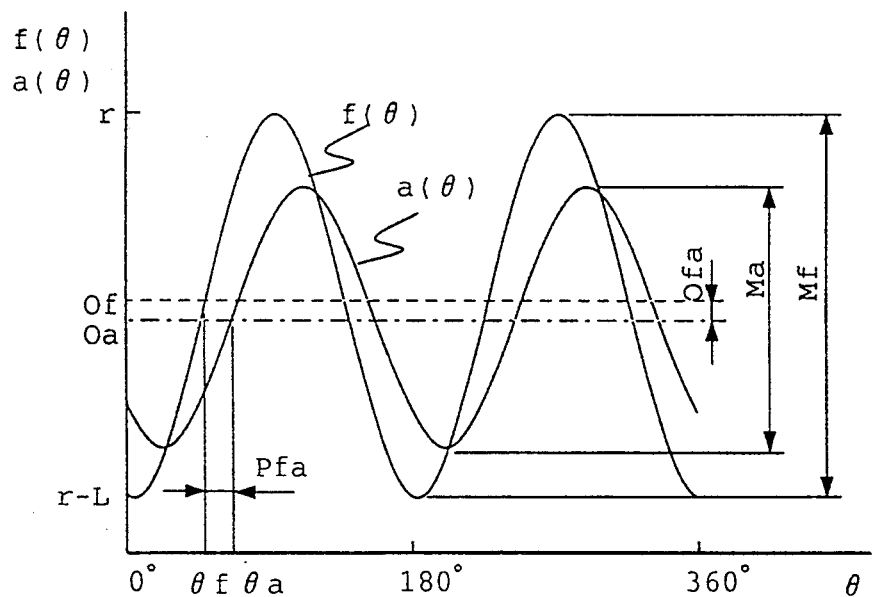
FIG. 9 is a first waveform diagram illustrating an example of the method according to the present invention.

FIG. 7 is a block diagram illustrating, in relation to FIG. 2, a detailed example of a driving control section of the X-axis servo mechanism 2 which is included in the control apparatus 1 for performing a machining-error correcting method applied to a non-circular shape machining apparatus according to the present invention, and FIG. 8 is a flow chart showing an example of its operation. The workpiece 3 is rotated at a desired rotation speed with the spindle motor 5 driven by the spindle driving apparatus 4. The pulse generator 6 detects the rotation of the workpiece 3 as the pulse PS and sends it to the counter 21, which counts the supplied pulse PS and adopts it as the rotation angle $\theta$ of the workpiece 3. The target position $f(\theta)$ of the tool 10 or a value close to the target position $f(\theta)$ is stored in advance as the command position $c(\theta)$ in the command position data memory 25, the command position data reading section 22 reads the command position $c(\theta)$ corresponding to the rotation angle $\theta$ of the workpiece 3 which angle has been read out of the counter 21, from the command position data memory 25 and controls the X-axis servo mechanism 2. Then, the detected position data writing section 23 stores the position $a(\theta)$ of the tool 10 which is detected by the X-axis position detecting device 8 into the detected-position data memory 26 on an amount of one revolution of the workpiece 3, that is, on an extent of $\theta = 0°$ to 360° (Step S1). The target position $f(\theta)$ is stored in advance in the target position data memory 27, and a first amplitude-ratio detecting section 32, a first phase-difference detecting section 33 and an offset-difference detecting section 31 detect the first amplitude-ratio Afa, the first phase-difference Pfa and the offset-difference Ofa, from the target position $f(\theta)$ which is read out of the target position data memory 27 and from the detected position $a(\theta)$ which is read out of the detected-position data memory 26, respectively (Step S2). That is, the amplitude-ratio Afa can be obtained by substituting the amplitude Mf of the target position $f(\theta)$ and the amplitude Ma of the detected position $a(\theta)$ with the below equation (2) as shown in FIG. 9.

$$Afa = Mf/Ma \tag{2}$$

The phase-difference Pfa can be obtained by an equation (3) as a difference between an angle $\theta f$ when the waveform of the target position $f(\theta)$ first crosses the offset value Of of the target position $f(\theta)$ and an angle $\theta a$ when the waveform of the detected position $a(\theta)$ first crosses the offset value Oa of the detected position $a(\theta)$.

$$Pfa = \theta f - \theta a \tag{3}$$

The offset-difference Ofa can be obtained by an equation (4) as a difference between the offset value Of of the target position $f(\theta)$ and the offset value Oa of the detected position $a(\theta)$.

$$Ofa = Of - Oa \tag{4}$$

However, the offset-difference Ofa needs not necessarily to be corrected because the offset-difference Ofa is negligibly small when the waveform of the target position $f(\theta)$ is a symmetrical waveform, whereby the offset-difference need not be obtained when not corrected. The offset value is generally obtained as a mean value of the waveform values over 0° to 360°, however, it is preferably obtained as a mean value between the maximum and minimum values of the waveform. This is because the maximum and minimum values of the waveform, that is, the maximum and minimum diameters of the workpiece are corrected so as coincide with each other at the next step.

Figure 10:
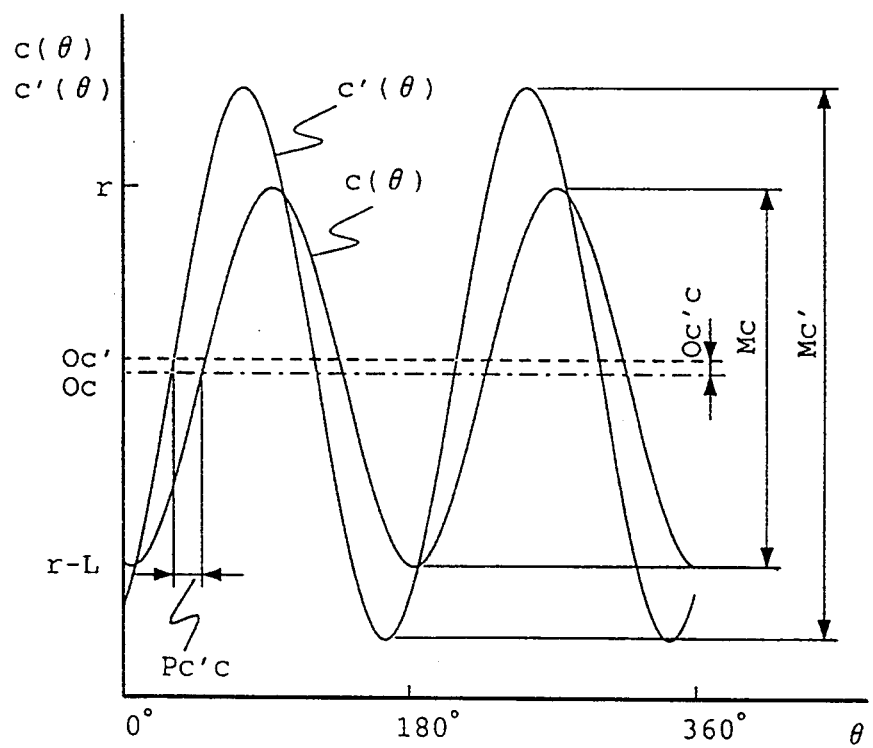
FIG. 10 is a second waveform diagram illustrating an example of the method according to the present invention.

At the following step, the command-position data amplitude/phase/offset correcting section 28 corrects the command position $c(\theta)$ which is read out of the command position data memory 25, on the basis of the first amplitude-ratio Afa, the first phase difference Pfa and the offset-difference Ofa which are transmitted from the first amplitude-ratio detecting section 32, the first phase-difference detecting section 33 and the offset-difference detecting section 31 respectively as shown in FIG. 10, and the command-position data amplitude/phase/offset correcting section 28 stores again the corrected command position $c(\theta)$ as the first corrected command position $c'(\theta)$ in the command position data memory 25 (Step S3). That is, the first corrected command position $c'(\theta)$ is expressed as the following equation (5).

$$c'(\theta) = KA \times Afa \times \{c(\theta - KP \times Pfa) - Oc\} + Oc + KO \times Ofa \tag{5}$$

where
KA: correction rate of the amplitude-ratio $0 < KA \leq 1$
KP: correction rate of the phase-difference $0 < KP \leq 1$
KO: correction rate of the offset-difference $0 \leq KO \leq 1$
Oc: offset of the command position $c(\theta)$
$\theta$: rotation angle of the workpiece
Afa: amplitude-ratio of the target position $f(\theta)$ to the detected position $a(\theta)$
Ofa: offset-difference between the target position $f(\theta)$ and the detected position $a(\theta)$
Pfa: phase-difference between the target position $f(\theta)$ and the detected position $a(\theta)$
$c'(\theta)$: first corrected command position
$c(\theta)$: command position The correction rate KA of the amplitude-ratio, the correction rate KP of the phase-difference and the correction rate KO of the offset-difference are respectively constants, and those values are corrected by an amount of occurred error when those values are '1'. A graph of the relationship between the command position $c(\theta)$ and the first corrected command position $c'(\theta)$ is shown in FIG. 10. However, when the above correction is repeated, those values is preferably set at a smaller value than '1' because an effect of an error occurred from non-repetition is eliminated. By the correction mentioned above, the errors occurred based on the amplitude, the phase and the offset of the waveform can be eliminated. Alternatively, since most of the errors are removed by the above correction, an accuracy of the machining can be achieved to some extent even by controlling the X-axis servo mechanism on the basis of the first corrected command position $c'(\theta)$ to machine the workpiece, whereby this step may be brought to an end.

Figure 11:
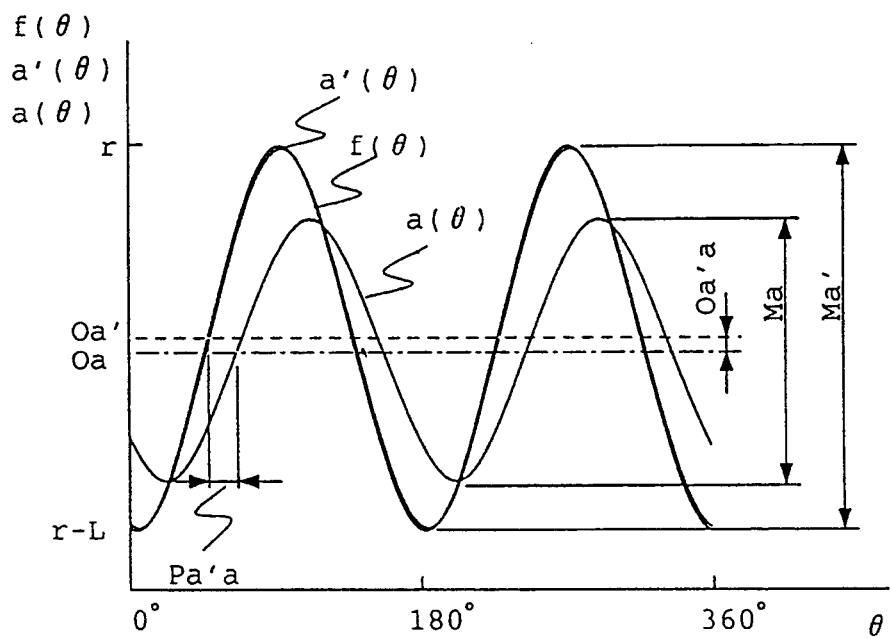
FIG. 11 is a third waveform diagram illustrating an example of the method according to the present invention.

Next, a predicted detection position data computing section 34 calculates a predicted detection position $a'(\theta)$ on the basis of the detected position $a(\theta)$, the first amplitude-ratio Afa, the phase-difference Pfa and the offset-difference Ofa which are respectively transmitted from the first amplitude-ratio detecting section 32, the first phase-difference detecting section 33 and the offset-difference detecting section 31, as expressed in the below equation (6) (Step S4).

$$a'(\theta) = KA \times Afa \times \{a(\theta - KP \times Pfa) - Oa\} + Oa + KO \times Ofa \tag{6}$$

where
KA: correction rate of the amplitude-ratio $0 < KA \leq 1$
KP: correction rate of the phase-difference $0 < KP \leq 1$
KO: correction rate of the offset-difference $0 \leq KO \leq 1$
Oa: offset value of the detected position $a(\theta)$
$\theta$: rotation angle of the workpiece
Afa: amplitude-ratio of the target position $f(\theta)$ to the detected position $a(\theta)$
Ofa: offset-difference between the target position $f(\theta)$ and the detected position $a(\theta)$ Pfa: phase-difference between the target position $f(\theta)$ and the detected position $a(\theta)$ $a(\theta)$: detected position $a'(\theta)$: predicted detection position In FIG. 11, there is shown a graph of relations between the detected position $a(\theta)$ when the correction rate KA of the amplitude-ratio, the correction rate KP of the phase-difference and the correction rate KO of the offset-difference are respectively '1', and the predicted detection position $a'(\theta)$. The predicted detection position $a'(\theta)$ is formed in a waveform close to the target position $f(\theta)$, and is perfectly coincided with that of the target position $f(\theta)$ if no distortion of the waveform has occurred in the servo mechanism.

In the next step, the predicted error position data computing section 35 calculates a difference between the target position $f(\theta)$ being read out of the target position data memory 27 and the predicted detection position $a'(\theta)$ being supplied from the predicted detection position data computing section 34, as a predicted error $d(\theta)$, as expressed below in equation (7) (Step S5).

$$d(\theta) = f(\theta) - a'(\theta) \quad (7)$$

where $f(\theta)$: target position $a'(\theta)$: predicted detection position $\theta$: rotation angle of the workpiece $d(\theta)$: predicted error A second amplitude-ratio detecting section 30 and a second phase-difference detecting section 29 respectively detect the second amplitude-ratio Ac' f and the phase-difference Pc' f on the first correction command position $c'(\theta)$ and the detected position $a(\theta)$ which are respectively read from the command position data memory 25 and the detected-position data memory 26. A command position data distortion-correcting section 24 then corrects the first correction command position $c'(\theta)$ which is read from the command position data memory 25, on the basis of the second amplitude-ratio Ac' f, the second phase-difference Pc' f and the predicted error $d(\theta)$ which are respectively transmitted from the second amplitude-ratio detecting section 30, the second phase-difference detecting section 29 and the predicted error-position data computing section 35, as expressed below in equation (8), then again stores the first correction command position $c'(\theta)$ as the second correction command position $c''(\theta)$ in the command position data memory 25 (Step S6).

$$c''(\theta) = c'(\theta) + Kd \times Ac' f \times d(\theta - Pc' f) \quad (8)$$

where

Figure 12:
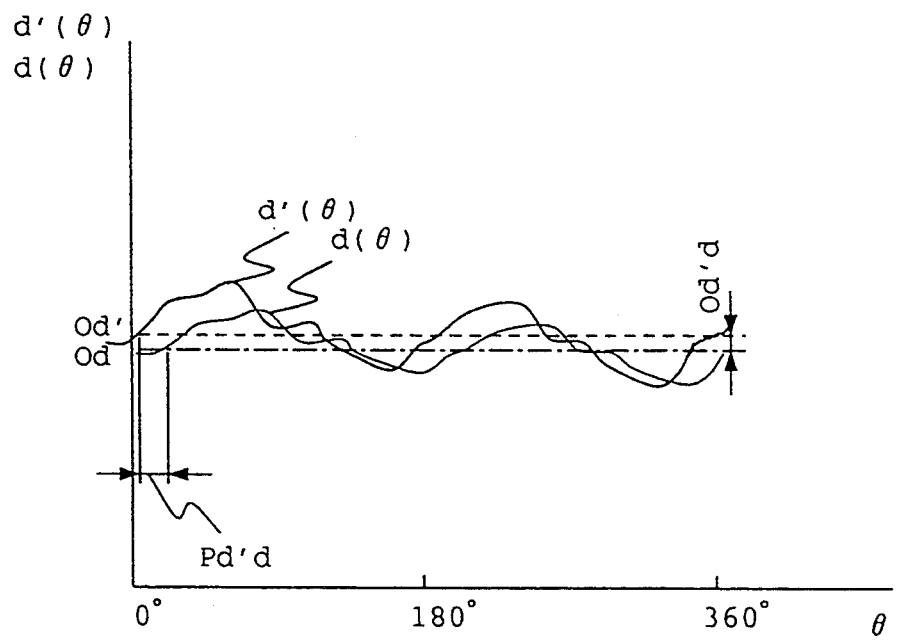
FIG. 12 is a fourth waveform diagram illustrating an example of the method according to the present invention.
Figure 13:
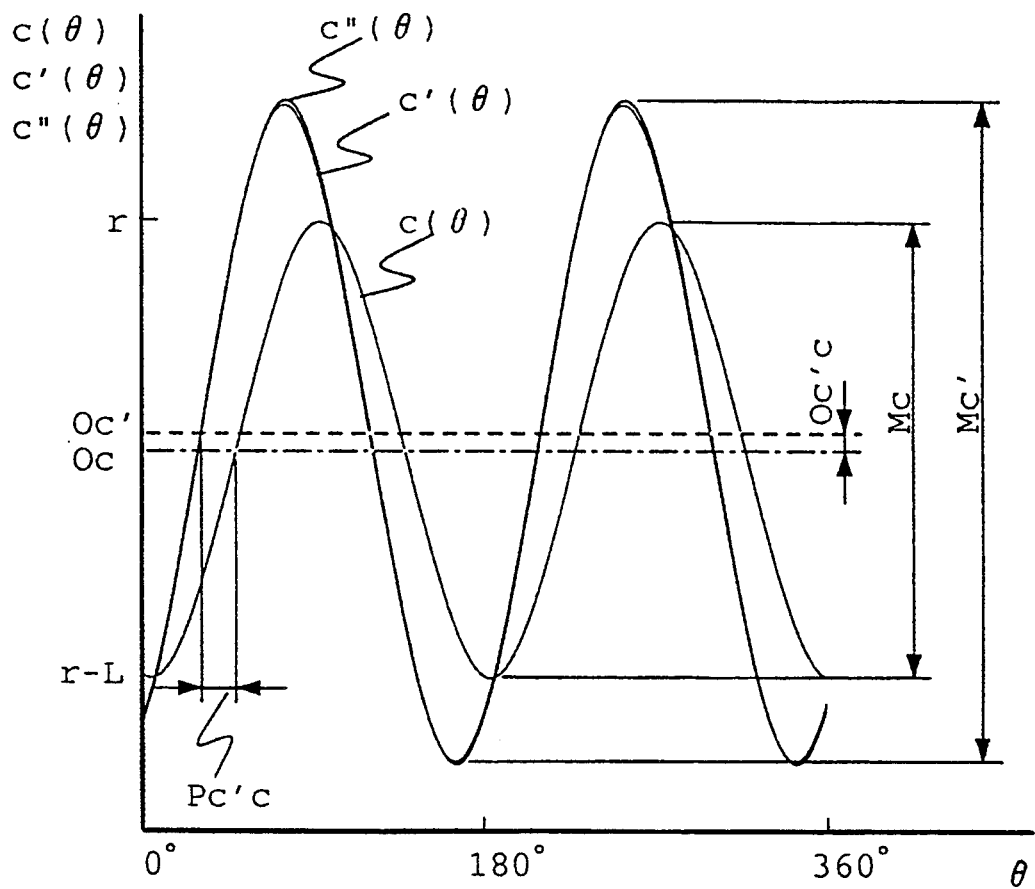
FIG. 13 is a fifth waveform diagram illustrating an example of the method according to the present invention.

Ac ' f: amplitude ratio of first correction command position $c'(\theta)$ to detected position $a(\theta)$ Pc ' f: phase difference between first correction command position $c'(\theta)$ and detected position $a(\theta)$ $c''(\theta)$: second command position $c'(\theta)$: first command position $\theta$: rotation angle of workpiece Kd: predicted error correction coefficient of $0 < Kd \leq 1$ $d(\theta)$: predicted error A relation between the second term on right side, which is expressed in '$d'(\theta)$', and the predicted error $d(\theta)$ is shown in a graph of FIG. 12. In addition, a relation between the first correction command position $c'(\theta)$ and the second correction command position $c''(\theta)$ is shown in a graph of FIG. 13.

It is preferred that the predicted error correction coefficient Kd is set at '1' or a value close to '1' and that the predicted error correction coefficient Kd is reduced at every Step S5 being repeated until it becomes an appropriately smaller value. This is because an error is significantly corrected since the error first is large and hereafter the effect of error caused from non-repetition decreases by reducing the correction rate of the predicted error correction coefficient Kd. The command position data reading section 22 reads the second correction command position $c''(\theta)$ corresponding to the rotation angle $\theta$ of the workpiece 3 which is read from the counter 21, out of the command position data memory 25 to control the X-axis servo mechanism 2. Then, the detected-position data writing section 23 writes the position $a(\theta)$ detected from the X-axis position detector 8 on an amount of one revolution of the workpiece 3, that is, on an extent of $\theta = 0°$ to $360°$ into the detected-position data memory 26 (Step S7). The predicted detection position data computing section 34 judges whether the difference between the detected position $a(\theta)$ and the target position $f(\theta)$ which are read out of the detected-position data memory 26 and the target position data memory 27 respectively, is larger than a predetermined value or not (Step S8), and finishes all of the operation if the difference is not larger than the predetermined value. Alternatively, when the difference is larger than the fixed value, the predicted detection position data computing section 34 replaces the command position $c(\theta)$ with the second correction command position $c''(\theta)$ (Step S9), then returns to the Step S2 and repeats the operation described above.

Figure 14:
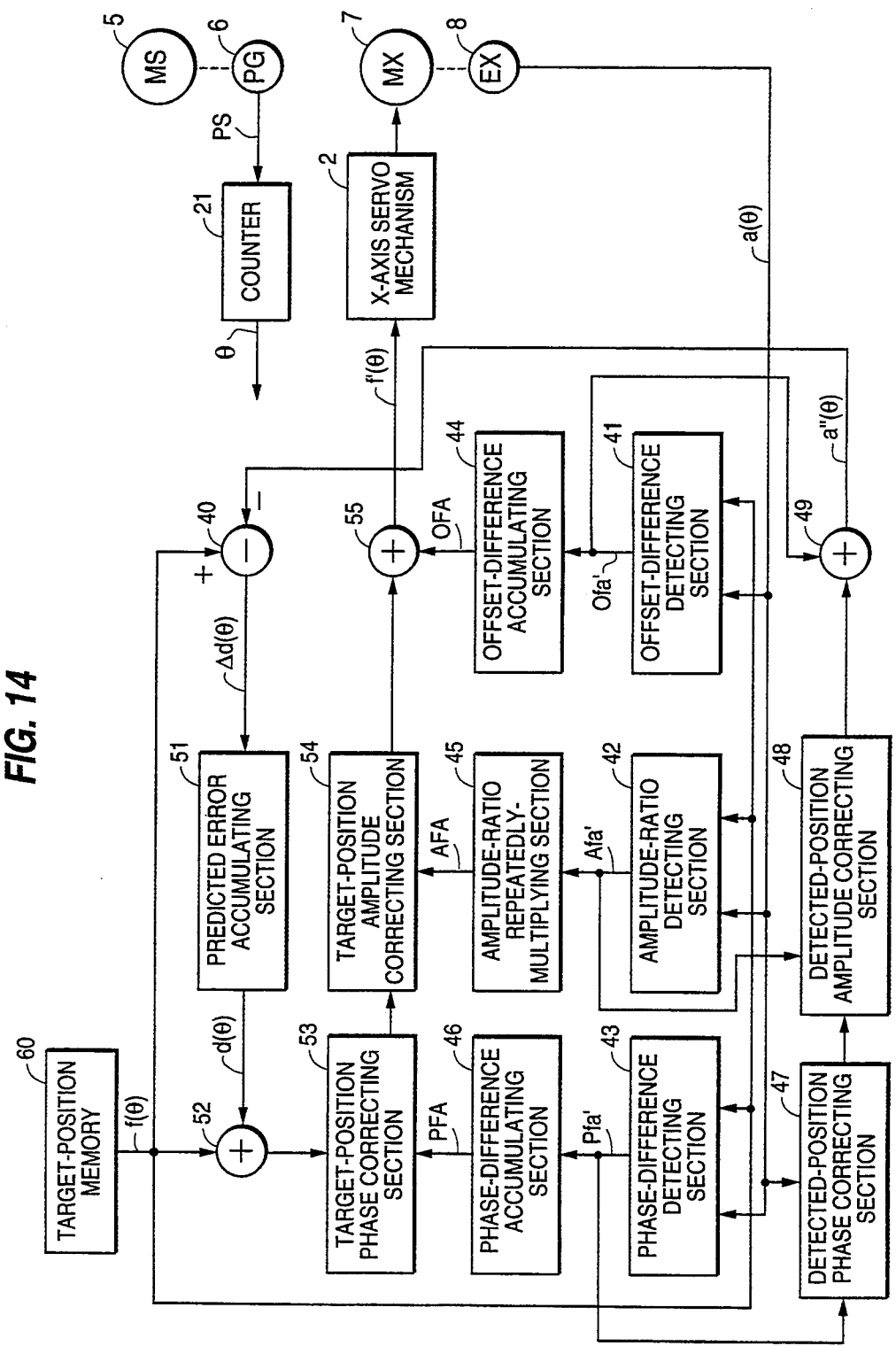
FIG. 14 is a block diagram showing another example of the control apparatus which conducts the machining-error correcting method for the non-circular shape machining apparatus according to the present invention.
Figure 15:
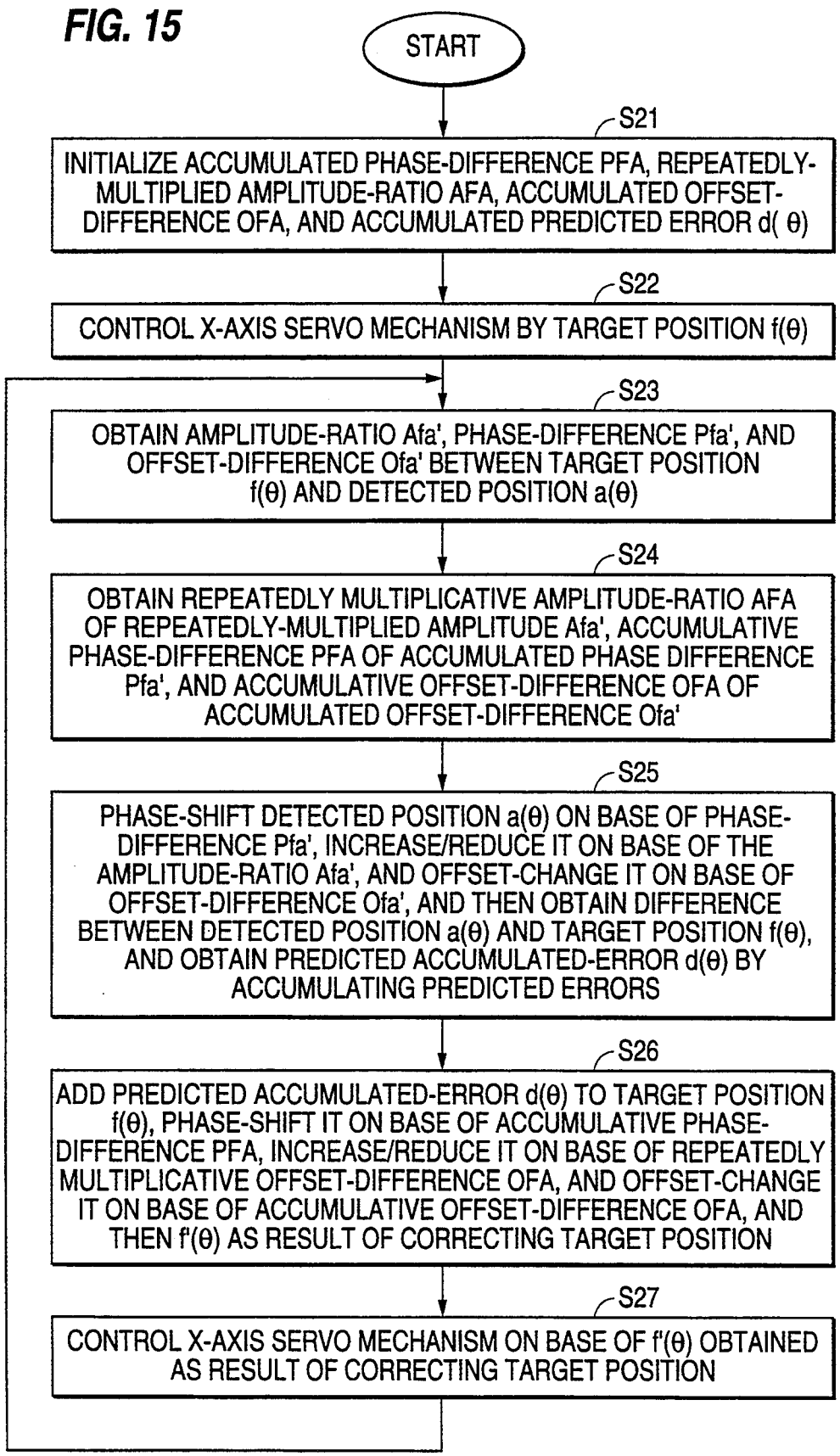
FIG. 15 is a flow chart showing an example of the operation of the method according to the present invention.
Figure 16:
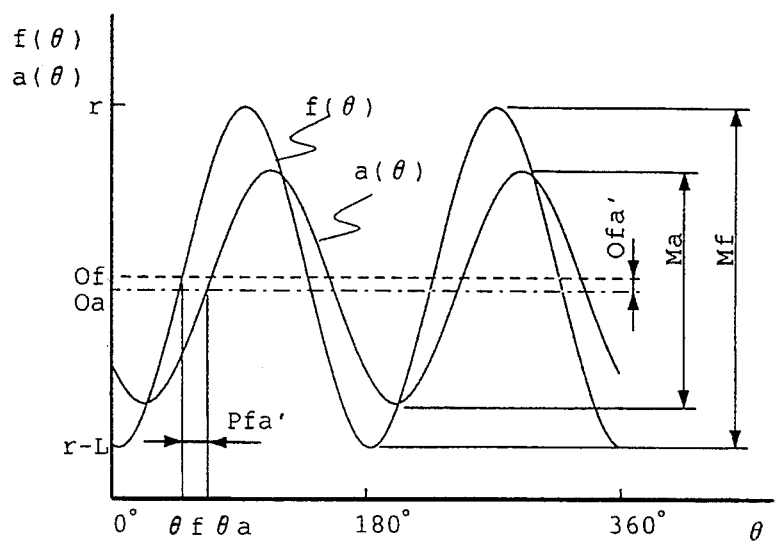
FIG. 16 is a first waveform diagram illustrating another example of the method according to the present invention.

FIG. 14 is a block diagram showing, in relation to FIG. 2, another detailed example of a driving control section of the X-axis servo mechanism 2 which is included in a control apparatus 1 for performing a machining-error correcting method applied to the non-circular shape machining apparatus according to the present invention, and FIG. 15 is a flow chart showing a mode of its operation. The workpiece 3 is rotated at a desired rotation speed with the spindle motor 5 driven by the spindle driving apparatus 4. The pulse generator 6 detects the rotation of the workpiece 3 as the pulse PS and sends it to the counter 21, which counts the supplied pulse PS and adopts it as the rotation angle $\theta$ of the workpiece 3.

On the other hand, an accumulated phase-difference PFA, a repeatedly-multiplied amplitude-ratio AFA, an accumulated offset-difference OFA and an accumulated predicted-error $(d\theta)$ which are the outputs of a phase-difference accumulating section 46, an amplitude-ratio repeatedly-multiplying section 45, an offset-difference accumulating section 44 and a predicted-error accumulating section 51 respectively, are initialized to '0', '1', '0', and '0' respectively (Step S21).

The target position $f(\theta)$ of the tool 10 is stored in advance in a target position memory 60, and the X-axis servo mechanism 2 is controlled according to the target position $f(\theta)$ (Step S22). An amplitude-ratio detecting section 42, a phase-difference detecting section 43 and an offset-difference detecting section 41 respectively detect an amplitude-ratio Afa', a phase-difference Pfa' and an offset-difference Ofa' relating to the position $a(\theta)$ of the tool 10 which is detected by the X-axis position detecting device 8 and the target position $f(\theta)$ of the tool 10 which is read out of the target position memory 40 from them (Step S23). That is, the amplitude-ratio Afa' can be obtained by substituting the amplitude Mf of the target position f($\theta$) and the amplitude Ma of the detected position a($\theta$) into an equation (9).

$$Afa' = Mf/Ma \qquad (9)$$

The phase-difference Pfa' is obtained by an equation (10) as a difference between the angle $\theta f$ when the wave of the target position f($\theta$) first crosses the offset value Of of the target position f($\theta$) and the angle $\theta a$ when the wave the detected position a($\theta$) first crosses the offset value Oa of the detected position a($\theta$).

$$Pfa' = \theta f - \theta a \qquad (10)$$

The offset-difference Ofa' is obtained by the equation (11) as a difference between the offset value Of of the target position f($\theta$) and the offset value Oa of the detected position a($\theta$).

$$Ofa' = Of - Oa \qquad (11)$$

The offset value of the waveform is generally obtained as a mean value of the waveform value over 0° to 360°, however, it is preferably obtained as a mean value between the maximum and minimum values of the waveform. This is because the maximum and minimum values of the waveform, that is, the maximum and minimum diameters of the workpiece are corrected so as to be coincided with each other at the next step.

The amplitude-ratio repeatedly-multiplying section 45, the phase-difference accumulating section 46 and the offset-difference accumulating section 44 repeatedly multiply the amplitude-ratio Afa' supplied from the amplitude-ratio detecting section 42, accumulate the phase-difference, Pfa' supplied from the phase-difference Ofa' supplied from the offset-difference detecting section 41 every revolution of the spindle motor 5 respectively, and thereby hold the repeatedly-multiplied amplitude-ratio AFA, the accumulated phase-difference PFA and the accumulated offset-difference OFA respectively (Step S24).

A detected-position phase correcting section 47 corrects the position a($\theta$) of the tool 10 detected by the X-axis position detecting device 8, on the basis of the phase-difference Pfa' supplied from the phase-difference detecting section 43, and sends it to a detected-position amplitude correcting section 48. The detected-position amplitude correcting section 48 multiplies the corrected position of the tool 10 by the amplitude-ratio Afa' supplied from the amplitude-ratio detecting section 42, and sends the product to an adder 49. The adder 49 adds the offset-difference Ofa' supplied from the offset-difference detecting section 41 to the position of the tool 10 to which the amplitude-ratio Afa' is added, to obtain a predicted detected-position a''($\theta$). The predicted detected-position a''($\theta$) can be obtained by equation (12).

$$a''(\theta) = \{a(\theta - Pfa') - Oa\} \times Afa' + Oa + Ofa \qquad (12)$$

where
a''($\theta$): predicted detected-position
a($\theta$): detected position
Oa: offset value of the detected position a($\theta$)
Afa': amplitude ratio of a target position f($\theta$) to the detected position a($\theta$)
Ofa': offset difference between the target position f($\theta$) and the detected position a($\theta$)

Figure 17:
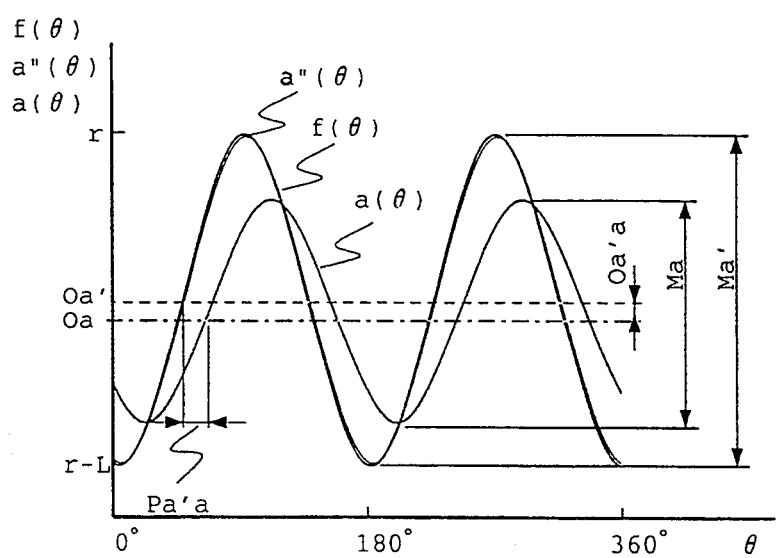
FIG. 17 is a second waveform diagram illustrating another example of the method according to the present invention.
Figure 18:
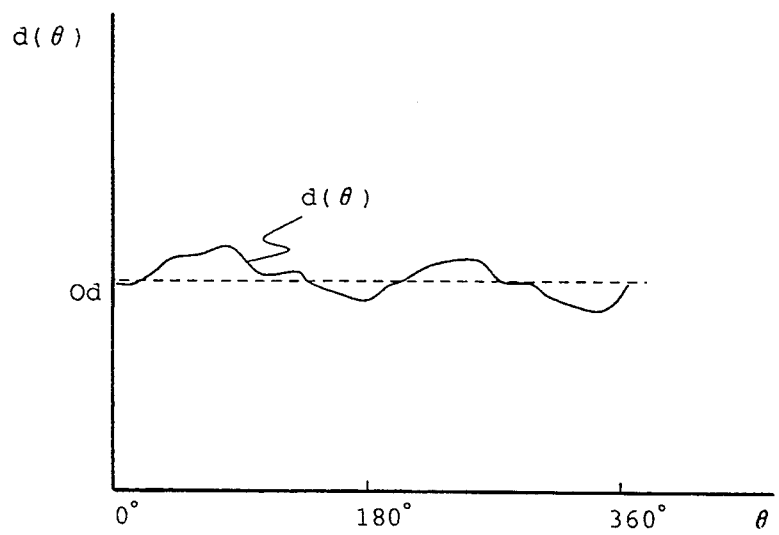
FIG. 18 is a third waveform diagram illustrating another example of the method according to the present invention.

FIG. 17 shows a graph of relations among the target position f($\theta$), the detected position a($\theta$) and the predicted detected-position a''($\theta$), and the predicted detected-position a''($\theta$) has a waveform similar to the target position f($\theta$), however, a little error still remains. A subtracter 50 then subtracts the predicted detected-position a''($\theta$) supplied from the adder 49, from the target position f($\theta$) read out of the target position memory 40 every revolution of the spindle motor 5, and a predicted error d($\theta$) is obtained as shown in a below equation (13).

$$\Delta d(\theta) = f(\theta) - a''(\theta) \qquad (13)$$

where
f($\theta$): target position
a''($\theta$): predicted detected-position
$\Delta$d($\theta$): predicted error The predicted error accumulating section 51 then accumulates the predicted error $\Delta$d($\theta$) supplied from the subtracter 50 and holds an accumulated predicted-error d($\theta$) which is obtained by an equation (14) as shown in FIG. 18 (Step S25).

$$d(\theta) = \Sigma \Delta d(\theta) \qquad (14)$$

where
$\Delta$d($\theta$): predicted error
d($\theta$): accumulated predicted-error At the next step, an adder 52 adds the accumulated predicted-error d($\theta$) supplied from the predicted-error accumulating section 51 to the target position f($\theta$) read out of the target position memory 40, and the product to a target-position phase correcting section 53. The target-position phase correcting section 53 corrects the accumulated phase-difference PFA supplied from the phase-difference repeatedly-multiplying section 46 on the basis of the added value, and its corrected value to a target-position amplitude correcting section 54. The target-position amplitude correcting section 54 corrects the repeatedly-multiplied amplitude-ratio AFA supplied from the amplitude-ratio repeatedly-multiplying section 45 on the basis of the above corrected accumulated-phase-difference, and sends its corrected amplitude-ratio to an adder 55. The adder 55 adds the corrected repeatedly-multiplying amplitude-ratio to the accumulated offset-difference OFA supplied from the offset-difference accumulating section 44 to obtain a corrected target-position f'($\theta$), the X-axis servo mechanism 2 can be controlled (Steps S26 and S27). This corrected target-position f'($\theta$) is given by a below equation (15).

$$f'(\theta) = \{f(\theta - PFA) - Of\} \times AFA + Of + OFA \qquad (15)$$

where
f'($\theta$): corrected target-position
f($\theta$): target-position
PFA: accumulated phase-difference
Of: offset-difference of the target-position f($\theta$)
AFA: repeatedly multiplied amplitude-ratio
OFA: accumulated offset-difference According to the present invention, the method of the invention which corrects an error that has occurred as a result of a servo mechanism being unable to fully follow the command position, can make the detected position of a tool coincide with the target position quickly since the method determines the target position and the detected position as a waveform, and thereby corrects each error of the waveform divided into an amplitude, a phase, an offset and a distorsion.

What is claimed is:

1. In a process for correcting a machining-error of a non-circular shape machining apparatus by controlling a movement of a tool which is synchronous with a rotation of a workpiece, a machining-error correcting method used for said non-circular shape machining apparatus, comprising the steps of:

detecting a position of said tool relative to a rotational axis of said workpiece while said tool is alternately and repeatedly moved toward and away from the rotational axis of said workpiece according to a command position which is coincident with or close to a target position of said tool to obtain a detected position;

obtaining an amplitude ratio, a phase difference, and an offset difference between said target position and said detected position;

performing a process of changing an amplitude of said command position on the basis of said amplitude ratio, a process of shifting a phase of said command position on the basis of said phase difference, and a process of changing an offset of said command position on the basis of said offset difference, whereby a first corrected command position is obtained;

performing a process of changing an amplitude of said detected position on the basis of said amplitude ratio, a process of shifting a phase of said detected position on the basis of said phase difference, and a process of changing an offset of said detected position on the basis of said offset difference, whereby a predicted detected-position is obtained; and performing a process of obtaining a difference between said target position and said predicted detected-position as a predicted error, and a process of correcting said first corrected command position by said predicted error to obtain a second corrected command position.

2. A machining-error correcting method used for the non-circular shape machining apparatus as claimed in claim 1, further comprising:

detecting a corrected position of said tool when said tool is moved according to said second corrected command position;

replacing said command position with said second corrected command position when a difference between the detected corrected position and said target position is at least a predetermined value; and performing repeatedly the processes for obtaining said second corrected command position.

3. A machining-error correcting method used for the non-circular shape machining apparatus as claimed in claim 1, wherein said predicted detected-position is obtained in accordance with the following equation.

$$a'(\theta) = KA \times Afa \times \{a(\theta - KP \times Pfa) - Oa\} + Oa + KO \times Ofa$$

where

KA: correction rate of the amplitude-ratio $0 < KA \leq 1$

KP: correction rate of the phase-difference $0 < KP \leq 1$

KO: correction rate of the offset-difference $0 \leq KO \leq 1$

Oa: offset value of the detected position $a(\theta)$ $\theta$: rotation angle of the workpiece Afa: amplitude-ratio of the target position $f(\theta)$ to the detected position $a(\theta)$ Ofa: offset-difference between the target position $f(\theta)$ and the detected position $a(\theta)$ Pfa: phase-difference between the target position $f(\theta)$ and the detected position $a(\theta)$ $a(\theta)$: detected position $a'(\theta)$: predicted detection position.

4. A machining-error correcting method used for the non-circular shape machining apparatus as claimed in claim 1, wherein said predicted error is obtained in accordance with the following equation.

$$d(\theta) = f(\theta) - a'(\theta)$$

where $f(\theta)$: target position $a'(\theta)$: predicted detection position $\theta$: rotation angle of the workpiece $d(\theta)$: predicted error, 5. A machining-error correcting method used for the non-circular shape machining apparatus as claimed in claim 1, wherein said second corrected command position is obtained in accordance with the following equation.

$$c''(\theta) = c'(\theta) + Kd \times Ac'f \times d(\theta - Pc'f)$$

where

Ac' f: amplitude ratio of first correction command position $c'(\theta)$ to detected position $a(\theta)$ Pc' f: phase difference between first correction command position $c'(\theta)$ and detected position $a(\theta)$ $c''(\theta)$: second command position $c'(\theta)$: first command position $\theta$: rotation angle of workpiece Kd: correction rate of predicted error $0 < Kd \leq 1$ $d(\theta)$: predicted error.

6. A machining-error correcting method used for the non-circular shape machining apparatus as claimed in claim 5, wherein a correction amount of said first corrected command using said predicted error is successively reduced.

7. In a process for correcting a machining-error of a non-circular shape machining apparatus by controlling a movement of a tool which is synchronous with a rotation of a workpiece, a machining-error correcting method used for said non-circular shape machining apparatus, comprising the steps of:

detecting a position of said tool relative to a rotational axis of said workpiece while said tool is alternately and repeatedly moved toward and away from the rotational axis of said workpiece according to a command position which is coincident with or close to a target position of said tool to obtain a detected position;

obtaining an amplitude ratio, a phase difference, and an offset difference between said target position and said detected position; and performing a process of changing an amplitude of said command position on the basis of said amplitude ratio, a process of shifting a phase of said command position on the basis of said phase difference, and a process of changing an offset of said command position on the basis of said offset difference, whereby a first corrected command position is obtained;

wherein said first corrected command position is obtained in accordance with the following equation, $$c'(\theta) = KA \times Afa \times \{c(\theta - KP \times Pfa) - Oc\} + Oc + KO \times Ofa$$

where

KA: correction rate of the amplitude-ratio $0 < KA \leq 1$

KP: correction rate of the phase-difference $0 < KP \leq 1$

KO: correction rate of the offset-difference $0 \leq KO \leq 1$

Oc: offset of the command position $c(\theta)$ $\theta$: rotation angle of the workpiece Afa: amplitude-ratio of the target position $f(\theta)$ to the detected position $a(\theta)$ Ofa: offset-difference between the target position $f(\theta)$ and the detected position $a(\theta)$ Pfa: phase-difference between the target position $f(\theta)$ and the detected position $a(\theta)$ $c'(\theta)$: first corrected command position $c(\theta)$: command position.

* * * * *